United States Patent [19]
Popper et al.

[11] 3,820,199
[45] June 28, 1974

[54] MECHANICAL COUPLING MEANS

[75] Inventors: Jakhin Boaz Popper, Kiryat Motzkin; Arie Ashkenazi, Haifa, both of Israel

[73] Assignee: The State of Israel, Ministry of Defence, Hakirya, Tel Aviv, Israel

[22] Filed: Apr. 4, 1972

[21] Appl. No.: 240,964

[30] Foreign Application Priority Data
Apr. 12, 1971  Israel.................................... 36590

[52] U.S. Cl. ................................................ 24/218
[51] Int. Cl. ............................................ A44b 17/00
[58] Field of Search ............... 24/218, 221; 287/119

[56] References Cited
UNITED STATES PATENTS

| | | | |
|---|---|---|---|
| 340,852 | 4/1886 | Baker | 24/224 LS |
| 476,978 | 6/1892 | Cabus | 24/218 |
| 1,367,350 | 2/1921 | Bourque | 24/218 UX |
| 1,497,806 | 6/1924 | Stenman | 24/218 |
| 3,079,188 | 2/1963 | Oswold | 24/218 X |
| 3,436,107 | 4/1969 | Karden | 287/119 R |
| 3,517,953 | 7/1970 | Wright et al. | 287/119 R |

Primary Examiner—Paul R. Gilliam
Attorney, Agent, or Firm—Kirschstein, Kirschstein, Ottinger & Frank

[57] ABSTRACT

In combination, male and female coupling elements, a wall portion of said female element defining a receiving bore, a spring loop anchored to the female element so as to embrace said bore, an internal peripheral flange formed in the female element, embracing said bore and located between the loop and the mouth, said loop and/or said flange surrounding between 20 to 80 per cent of the periphery of said bore, and axially successive wide and narrow portions of the male element separated by a peripheral shoulder thereof, the loop and the wide portion being so dimensioned that introduction of the male element into the bore causes an initial displacement of the loop so as to allow it to embrace the wide portion and a subsequent return displacement of the loop about the narrow portion whilst any subsequent axial withdrawal of the male element out of the bore is inhibited by the interposition of a portion of the loop between the flange of the female element and the shoulder of the male element.

4 Claims, 8 Drawing Figures

PATENTED JUN 28 1974 3,820,199

MECHANICAL COUPLING MEANS

This invention relates to mechanical coupling means and is particularly concerned with the effective coupling together of assemblies consisting of male and female elements. Such an assembly, for example, consists of a radio antenna and the socket in which it is to be connected, located, for example, in a motor vehicle body or transmitting or receiving apparatus. Other such assemblies consist, for example, of incandescent lamps or electric plugs and their respective sockets.

It is a desideratum with such assemblies that while the coupling and uncoupling of their constituent elements should be effected as simply and as rapidly as possible the assembly when coupled should be as stable as possible and that accidental uncoupling should be prevented to the maximum possible extent.

It is an object of the present invention, therefore, to provide new and improved means for coupling together such male and female elements so as to fulfil to a maximum extent the above referred to desideratum.

According to the present invention there is provided, in combination, male and female coupling elements, a receiving bore formed in the female element, a spring loop anchored to the female element so as to embrace said bore, an internal peripheral flange formed in the female element embracing said bore, and located between the loop and the mouth, said loop and/or said flange surrounding between 20 to 80 per cent of the periphery of said bore, and axially successive wide and narrow portions of the male element separated by a peripheral shoulder thereof, the loop and the wide portion being so dimensioned that introduction of the male element into the bore causes an initial displacement of the loop so as to allow it to embrace the wide portion and a subsequent return displacement of the loop about the narrow portion whilst any subsequent axial withdrawal of the male element out of the bore is inhibited by the interposition of a portion of the loop between the flange of the female element and the shoulder of the male element.

With such a combination, coupling of the two elements is readily effected as a result of a simple inserting movement of the male element into the female element, the two elements being retained coupled as result of the spring loop embracing, and being partially located in, the narrow portion of the male element. On the other hand, uncoupling cannot be effected by means of a simple withdrawal of the male element from the female element as any attempt merely to displace the male element axially out of the female element merely results in a portion of the loop being clamped between the flange of the female element and the shoulder of the male element thereby inhibiting withdrawal. Uncoupling can only be effected as a result of a dual operation, namely, exerting a withdrawing pressure on the male element with respect to the female element and at the same time imparting to the male element a turning movement with respect to the female element. It is only when such a dual action is carried out can the elements be uncoupled. It will be readily appreciated that the requirements for such a dual action renders extremely remote the possibility that the elements can become accidentally uncoupled.

For a better understanding of the present invention and to show how the same can be carried out in practice reference will now be made to the accompanying drawings in which.

Figure 1:
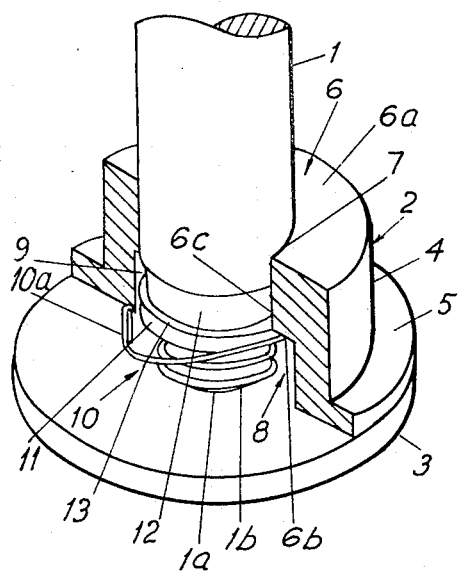
FIG. 1 is a perspective view (partially broken away) of a coupling assembly in accordance with the present invention shown immediately prior to coupling.

As seen in the drawings the assembly comprises a male element constituted by a cylindrical rod 1 and a female element constituted by a socket 2. The socket 2 comprises a base 3 and a cylindrical housing 4 having a lower, outwardly directed flange 5 by means of which it is secured to the base 3 and an upper inwardly directed flange 6 the annular upper surface 6a of the flange 6 surrounding the mouth 7 of the socket 2. The flange 6 is furthermore provided with an annular under surface 6b and an inner cylindrical surface 6c. There is defined between the flange under surface 6b, the upper surface of the base 3 and the inner surface of the housing 4 a peripheral recess 8 which surrounds a central bore 9 axially located in the housing.

A wire loop 10 (seen clearly in FIG. 1a and 1b) is located in the peripheral recess 8 and is formed with a pair of upwardly directed, turned over ends 10a respectively located in appropriate holes formed in the base 3. In this way the wire loop 10 is effectively anchored with respect to the socket 2 and consists of a pair of arms 10b which respectively rise from lowermost positions adjacent the ends 10a to a common junction 10c located adjacent the under surface 6b of the flange 6. The dimensions of the loop 10 and the flange 6 are such that, in the assembled condition, at least the portion 10c of the loop 10 is disposed below the under surface 6b of the flange 6 while the loop 10, as a whole, partially surrounds the central bore 9 (e.g., from 20 – 80 percent of the bore.

The rod 1 is formed with an end portion consisting successively (in direction from its free end) of a cylindrical tip 1a, a widened portion consisting of a cylindrical peripheral ridge 11, a narrow portion consisting of a cylindrical peripheral recess 12 and the main body of the rod 1. The recess 12 merges with the peripheral ridge 11 via a shoulder 13.

The ridge 11 is of a first diameter $D_1$ which is substantially equal to the diameter of the rod 1 and is such that the rod 1 forms a sliding fit within the socket 2. The diameter $D_1$ is, however, such that in the normal unstressed condition of the wire loop 10 and upon insertion of the rod member 1 into the socket the portion 10c of the loop is, in the assembled condition, disposed below the under surface of the ridge 11.

The recess 12 is of a diameter $D_2$ which, as indicated above, is less than the diameter $D_1$, the depth $(D_1-D_2)$ of the ridge being preferably between 40–85 percent of the thickness of the wire loop.

Figure 1A:
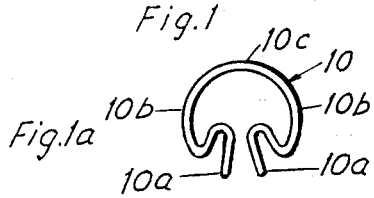
FIGS. 1a and 1b are respective plan and perspective views of a wire loop shown in FIG. 1.
Figure 1B:
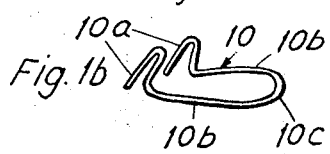

In order to couple the rod 1 to the socket 2 the end portion of the rod 1 is introduced into the central bore 9 of the socket via the mouth 7 until the under surface of the ridge 11 abuts on the portion 10c of the wire loop 10 as shown in FIG. 1 of the drawings. If now there is exerted on the rod 1 an axial pressure directed towards the socket 2, in the direction of the arrow, the loop 10 is initially displaced so that the portion 10c embraces the ridge 11 and when the rod 1 is pushed home, i.e., when the tip 1a abuts the base 3 and is surrounded by a coiled compression spring 1b, the recess 12 will be located opposite the recess 8 and in this position the loop 10 retracts with its portions 10c located effectively within the recess 12.

Figure 2:
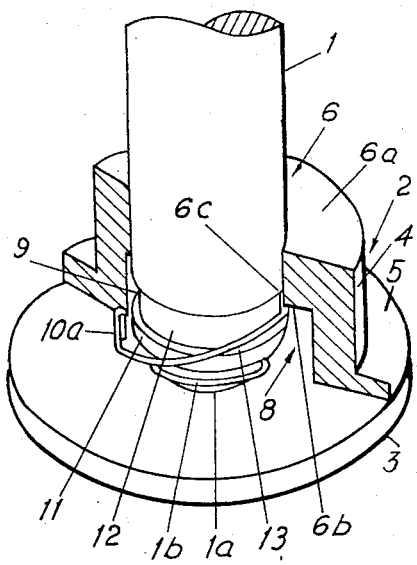
FIG. 2 is a view of the same assembly shown immediately after coupling.

The rod 1 and socket 2 are now effectively coupled as shown in FIG. 2 of the drawings, the spring 1b biassing the rod upwardly. Any attempt to uncouple the elements by exterting an axial pull on the rod 1 with respect to the socket 2 in the direction of the arrow merely results in the effective clamping of the portion 10c of the loop 10 between the under surface 6b of the flange 6 and the shoulder 13 of the ridge 11 thereby preventing the withdrawal of the rod 1 from the socket 2 no matter how great a withdrawal force is applied.

Figure 3A:
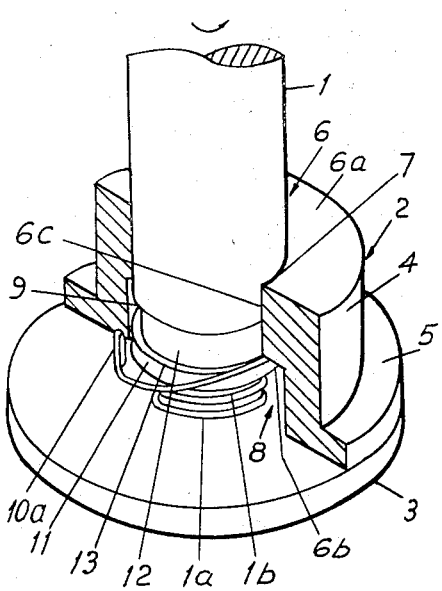
FIGS. 3a and 3b are respective views of the same assembly shown during two successive uncoupling stages.
Figure 3B:
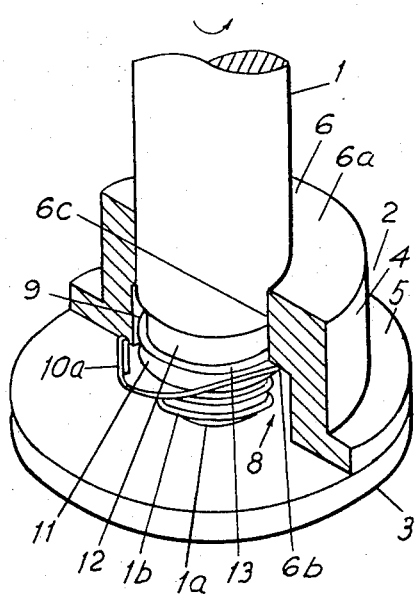

Where, however, as in FIG. 3a of the drawings, in addition to applying a withdrawing pull in an axial direction, the rod 1 is also rotated, withdrawal can be effected. It is to be noted that where, as in the present case, the loop is of symmetrical construction withdrawal can be effected by rotating the rod in either sense, where however the loop is of asymmetric construction the rod must be rotated in a preferred direction. The combined pull and turn imparted to the rod results in the distortion of the loop 10 so that it is displaced off the shoulder 13 and into a position where it embraces the ridge 11 (the successive stages in this displacing process being shown in FIGS. 3a and 3b of the drawings). With the loop displaced from off the shoulder 13 the rod 1 can be simply pulled out of the socket the released position being again as shown in FIG. 1 of the drawings.

In all cases, it must be ensured that the rod is adequately guided and supported within the socket. This can be achieved by either deepening the socket and the consequent degree of penetration thereof by the rod, or alternatively by providing a relatively shallow socket with a central guide pin which penetrates a central bore formed in the rod.

It will be seen that the coupling arrangement just described whilst allowing for an extremely simple and rapid coupling of the two elements prevents their uncoupling unless there is simultaneously exerted on the rod both a pull in the axial direction and a rotation about the axial direction. In this way it is assured that accidental uncoupling of the elements is prevented.

Furthermore, the provision of the wire loop is sufficient to prevent uncoupling of the elements even though extremely high pulling forces are exerted on the rod, the maximum pulling strength which can be borne being determined by the diameter of the wire and the difference in diameters of the narrow and wide portions of the rod. Finally, just as a simple pulling action exerted on the rod is not effective in uncoupling the elements without simultaneous rotation of the rod, so a simple rotation of the rod will not result in uncoupling without a simultaneous pulling. The fact that the simultaneous pulling and rotation is effective in securing release is believed to be due to the fact that when the two elements are pulled apart the portion 10c of the loop is firmly gripped between the under surface 6b of the flange and the shoulder 13 and that, with this portion firmly gripped, a rotation applied to the rod 1 is effective in distorting the loop 10 so that it slips off the shoulder 13.

It will be understood that the assembly just described has been described by way of example and can be modified within the scope of the present invention. Thus the base 3 can be secured to or form an integral portion of one element to be coupled together whilst the rod 1 can be secured to or form an integral portion of a second element to be coupled together. For example the base 3 can be secured to or form a portion of a fitting to be secured to a motor vehicle whilst the rod 1 can constitute a base portion of an antenna.

Figure 4:
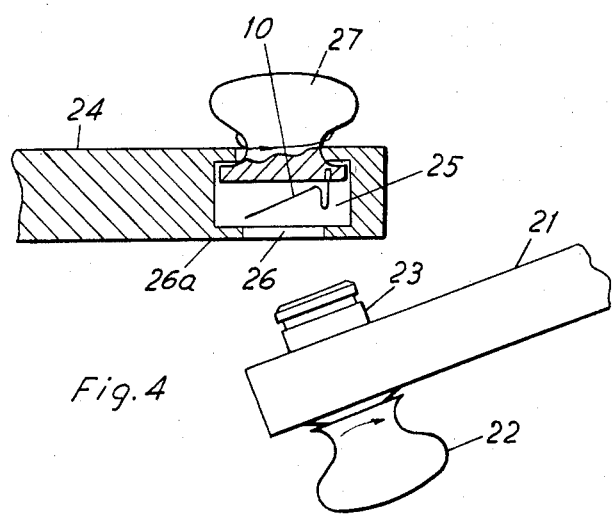
FIGS. 4 and 5 are respective views of two further embodiments of assemblies in accordance with the invention.

In the embodiment shown in FIG. 4 of the drawings, the assembly in accordance with the invention is applied to a door handle. Thus a first door 21 is provided with a handle 22 which is formed integrally with a rod 23 which is journalled in the door 21 so as to be rotatable together with the handle 22 with respect to the door 21. The end of the rod 23 is formed similarly to the end portions of the rod 1 described above. A further door 24 has formed therein a cavity 25 having a mouth 26 and flanged rim 26a. Located within the cavity 25 is the loop 10 which is anchored in the flanged base 27a of a handle 27 which projects out of the opposite side of the door 24 and is rotatable with respect thereto.

By pivotally displacing the first door 21 towards the further door 24 the rod 23 enters the cavity 25 and is retained by the loop 10. Release of the rod and opening of the doors can be effected by pulling either of the handles 22 and 27 and at the same time rotating it. Thus while in the previous embodiment release is always effected by rotating the rod in the present embodiment it is seen how release can be effected by rotating the loop.

In all the embodiments described it has been emphasized that release is effected by the simultaneous exertion of a withdrawal pressure on one element with respect to the other and at the same time imparting a turning movement to one element with respect to the other. As seen in FIGS. 1 to 3 of the drawings this withdrawal pressure can be wholly or partially provided by a spring 1b which tends to bias the two elements apart, the spring being located in the cavity accommodating the loop and being on the tip of the rod.

Figure 5:
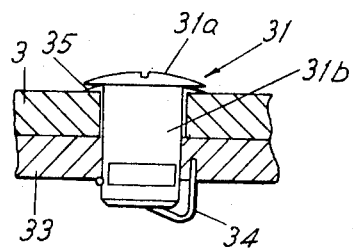

In an alternative embodiment shown in FIG. 5 of the drawings the assembly is applied to a rapid release bolt 31 having a bolt head 31a and a shaft 31b whose tip is formed as are the tips of the rod illustrated in FIGS. 1 to 3. The bolt 31 serves to secure together two plates 32 and passes through aligned apertures formed therein, a loop 34 in accordance with the invention being anchored to the rim of the aperture formed in the plate 33. A dished plate spring 35 surrounds the shaft 31b and is, in the retained condition of the bolt (shown in the drawings) sandwiched between the bolt head 31a and the plate 32. The two plates are coupled together by the simple insertion of the bolt 31 into the aligned apertures until its tip is retained by the loop 34. The dished spring 35 serves to bias apart the bolt 31 and the loop 34 and therefore permanently provides the required withdrawal pressure. Thus, in order to release the bolt all that is required is to rotate it whereupon it springs out.

It will be readily appreciated that the assembly in accordance with the invention can be readily adapted to any of a number of uses where it is required to effect simply and rapidly coupling between two elements and equally simply and rapidly to uncouple them.

We claim:

1. A mechanical coupling comprising:
   a. a male element in the form of a cylindrical rod having a circumferential recess defining a cylindrical ridge near the free end of the rod with a cylindrical outer surface located between an inner annular shoulder and the free end;
   b. a female element having a circular aperture of a size to slidably receive the cylindrical surface on the rod and having an internal circumferential recess defining an annular under-surface;
   c. a spring loop having a pair of spaced arms meeting in a common junction; and
   d. means securing a portion of the loop opposite the common junction to the female element in the recess such that the arms and junction are normally inclined with respect to the axis of the aperture toward the annular undersurface of the female element, the common junction normally projecting into the aperture for engaging the free end of the rod upon its insertion into the aperture, such insertion serving to resiliently pivot the arms and common junction of the loop in one direction away from the annular undersurface of the female element until the junction clears the cylindrical surface on the rod at which point the arms and common junction pivot in the opposite direction and the common junction slides over the cylindrical outer surface of the ridge and snaps behind the inner annular shoulder on the rod thereby releasably preventing its withdrawal from the circular aperture in the female element;
   e. the loop being resiliently deformable in response to rotation of the rod when the common junction is captured between the inner shoulder on the rod and the undersurface of the female element, sufficient deformation of the loop serving to retract the common junction from behind the inner shoulder on the rod thereby releasing the same.

2. A mechanical coupling according to claim 1 wherein at least the annular undersurface on the female element comprises between 20 to 80% of the periphery of the circular aperture in the female element.

3. A mechanical coupling according to claim 1 wherein the loop is substantially circular of a diameter no smaller than the diameter of the cylindrical ridge on the rod, and the portion of the loop secured to the female element is constituted by separate turned-over ends each of which is attached to the respective arms of the loop.

4. A mechanical coupling according to claim 1 including resilient means effective to bias the elements apart subsequent to their releasable connection.

* * * * *